United States Patent [19]

Kameyama

[11] Patent Number: 5,576,782
[45] Date of Patent: Nov. 19, 1996

[54] LENS-FITTED PHOTO FILM UNIT FOR USE WITH TAKING LENSES OF DIFFERENT FOCAL LENGTH

[75] Inventor: Nobuyuki Kameyama, Kanagawa, Japan

[73] Assignee: Fuji Photo Film Co., Ltd., Kanagawa, Japan

[21] Appl. No.: 329,323

[22] Filed: Oct. 26, 1994

[30] Foreign Application Priority Data

Oct. 29, 1993 [JP] Japan .................................. 5-272825

[51] Int. Cl.⁶ ........................... G03B 13/02; G03B 17/02
[52] U.S. Cl. ............................. 396/6; 396/351; 396/378; 396/535; 396/538
[58] Field of Search ............................. 354/75, 94, 159, 354/150, 202, 219, 222, 288

[56] References Cited

U.S. PATENT DOCUMENTS

| | | | |
|---|---|---|---|
| 4,884,087 | 11/1989 | Mochida et al. | 354/75 |
| 4,972,649 | 11/1990 | Mochida et al. | 354/288 X |
| 5,084,719 | 1/1992 | Hara et al. | 354/75 |
| 5,343,205 | 8/1994 | Oi et al. | 354/222 |
| 5,381,200 | 1/1995 | Takagai | 354/288 X |
| 5,436,685 | 7/1995 | Yamashina | 354/202 |

*Primary Examiner*—Safet Metjahic
*Assistant Examiner*—J. K. Han
*Attorney, Agent, or Firm*—Young & Thompson

[57] ABSTRACT

A lens-fitted photo film unit includes a taking lens, a film containing section, and an exposure unit secured in front of the film containing section. An exposure aperture is formed in the film containing section, which also includes a supply chamber and a take-up chamber. The supply chamber contains unexposed photo film. The take-up chamber is adapted to winding the photo film after exposure. The supply chamber and the take-up chamber are disposed beside the exposure aperture opposite to one another. The exposure unit includes a shutter device. An exposure tunnel is formed through the exposure unit and around a light path from the taking lens toward the exposure aperture, and protects the light path from ambient light. The exposure tunnel extends to the rear of the unit so that any of a variety of different exposure units can be used, depending on the focal length of the taking lens. The exposure unit is connected to the film containing section by hooks on the latter that extend outwardly away from each other in opposite directions, so that flexure of the unit will not disengage the hooks. The plural different exposure units will have viewfinders located at different positions on the unit, so that the rear wall of the unit has plural differently disposed viewfinder eyepiece openings of which only one is exposed through an opening in a cardboard cover, depending on which type of exposure unit is used.

16 Claims, 9 Drawing Sheets

LENS-FITTED PHOTO FILM UNIT FOR USE WITH TAKING LENSES OF DIFFERENT FOCAL LENGTH

BACKGROUND OF THE INVENTION

1. Field of the Invention

The present invention relates to a lens-fitted photo film unit. More particularly, the present invention relates to an improvement of a lens-fitted photo film unit suitable to be produced by automated mass production.

2. Description of the Prior Art

There is disclosed a lens-fitted photo film unit as a single-use camera suggested in commonly assigned co-pending patent application U.S. Ser. No. 08/203,556. It has a film containing section, of which the rear is pre-loaded with 135 film with a cassette in a factory. The 135 film is defined by International Organization for Standardization (ISO) 1007, 1979 version. An exposure unit includes a support member, on which a taking lens, a one-frame advance mechanism and a shutter device are mounted. The rear of the film containing section is covered with a rear cover in light-tight fashion. The front of the film containing section is covered with a front cover.

After effecting all exposures on the film as loaded, the lens-fitted photo film unit is given to a photofinisher and forwarded to a photo laboratory, where an operator removes the film in its cassette from the lens-fitted photo film unit, and subjects the film to development and printing in the widely available system of photofinishing. The photofinisher returns the developed film to the customer, and provides him with photo prints as produced.

There are various types of commercially available lens-fitted photo film units: a standard type, a panoramic type which effects exposures in a horizontally long format, a wide-angle type, and a telephoto type. There is also a type changeable between standard photography and panoramic photography for exposures on a single film, as suggested in commonly assigned co-pending patent application U.S. Ser. No. 08/169,203.

The lens-fitted photo film units of the different types are structurally similar regarding the film winding mechanism and the shutter device, but different in the photographic light path, which is defined from the taking lens to the exposure plane at the film. The telephoto type of lens-fitted photo film unit has a photographic light path that is approximately twice as long as that of a standard type, as the light path of the telephoto type is Z-shaped by reflection from an arrangement of mirrors. The type changeable between standard photography and panoramic photography incorporates two opaque movable plates about the light path for shielding light. There is no compatibility of parts inclusive of the film containing section, front cover and rear cover, which are specifically designed for each of the different types.

The lack of compatibility is disadvantageous in view of the cost of manufacturing the products which are of different types but include very similar parts. The total number of the parts is greater than it need be, so that the parts are more costly than they need be. In consideration of the low prices at which the lens-fitted photo film units are sold, this incompatibility results in a greater expense of manufacture.

The support member constituting the conventional exposure unit generally has an L-shape which includes a top portion for mounting a shutter drive mechanism and the one-frame advance mechanism and a front portion for mounting the shutter blade. The L-shape has the drawback of low rigidity. If the lens-fitted photo film unit is left to stand in an environment of high temperature for a long time, e.g. the inside of a car parked outside in the midsummer, then the support member or its bosses are deformed in irrecoverable fashion. The counter wheel is affected and fails to indicate a correct number that should be indicated. Although there is a system of recycling any usable parts of lens-fitted photo film units, the exposure unit after such deformation cannot be reused even after withdrawal of the parts. The suitability of the exposure unit for reuse and efficiency of manufacture are lowered.

SUMMARY OF THE INVENTION

In view of the foregoing problems, an object of the present invention is to provide a lens-fitted photo film unit of which at least one or more of the parts are compatible with plural different types of lens-fitted photo film units.

Another object of the present invention is to provide a lens-fitted photo film unit of which an exposure unit has a heightened rigidity.

In order to achieve the above and other objects and advantages of this invention, a film containing section has the exposure aperture, the supply chamber and the take-up chamber formed therein. An exposure unit is secured in front of the film containing section in removable fashion, and includes the shutter device. An exposure tunnel is formed through the exposure unit and around a light path from the taking lens toward the exposure aperture, and protects the light path from ambient light.

In a preferred embodiment, the exposure tunnel has a size defined in consideration of the focal length of the taking lens.

In the embodiment, this exposure unit includes the shutter device and the viewfinder, and can be any one of plural different exposure units. The film containing section has the exposure aperture formed therein, is provided with the selected exposure unit secured in front thereof, and contains the film. A rear cover is secured behind the film containing section, covers the film containing section, and supports the film behind the exposure aperture. Plural eyepiece openings are formed in the rear cover, and respectively located behind the viewfinders of the plural exposure units. A packaging is disposed around at least a portion of the exposure unit, the film containing section and the rear cover. A single eyepiece hole is formed in the packaging, and is superposed on one of the plural eyepiece openings in correspondence with the viewfinder of the selected exposure unit, with the remaining eyepiece openings blocked by the packaging.

It is possible to form the film containing section and/or the rear cover in a fashion compatible with plural different types of lens-fitted photo film units. The exposure unit can have a heightened rigidity. The novel lens-fitted photo film unit is highly suitable for automated mass production.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
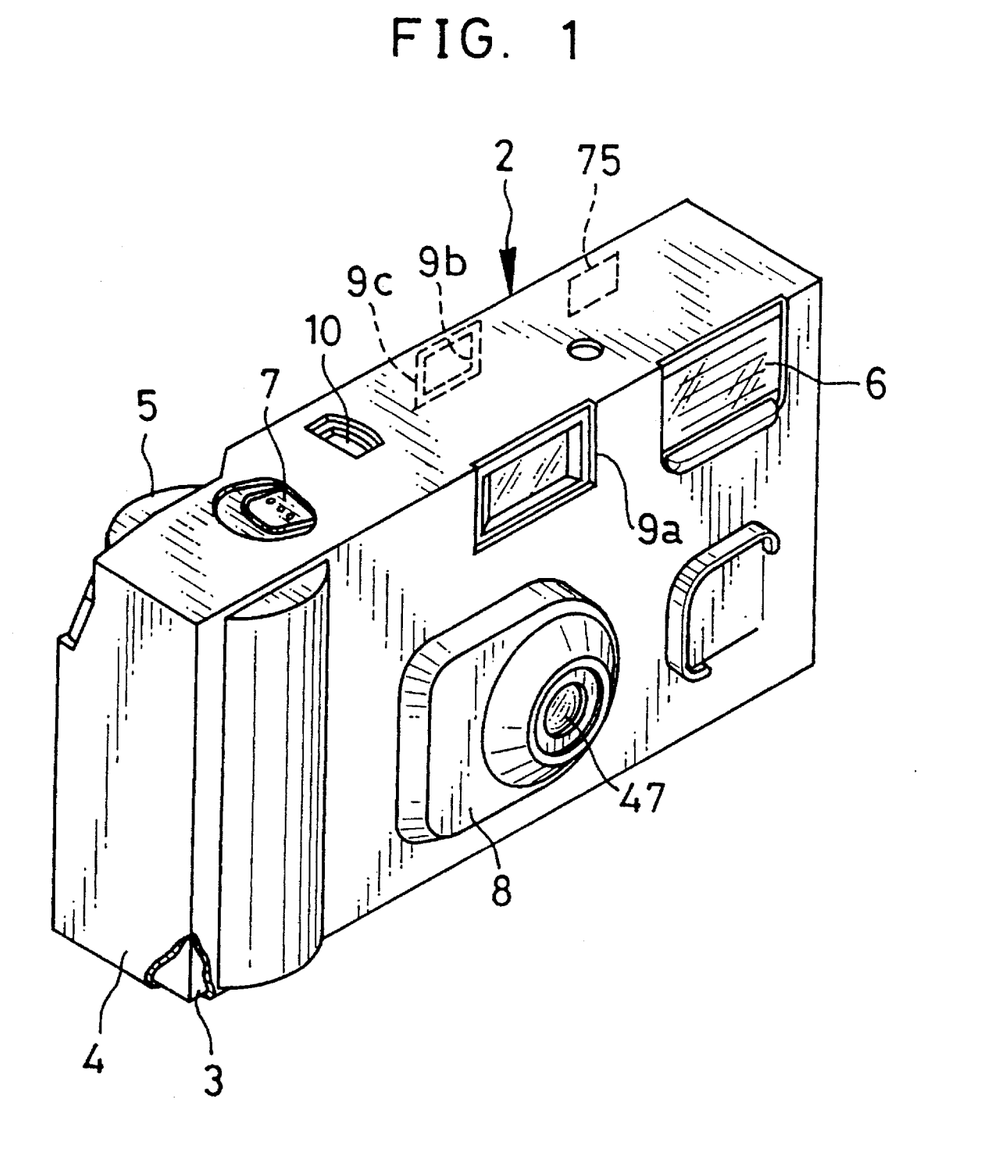
FIG. 1 is a perspective view illustrating a lens-fitted photo film unit of a standard type.

FIG. 1 illustrates appearance of a lens-fitted photo film unit 2 of the present invention. The photo film unit 2 is a type having a reduced thickness generally, and includes a film housing 3 incorporating a shutter device, and a packaging cardboard 4 covering the film housing 3. The packaging has openings to expose a winding wheel 5, a flash 6, and a shutter release button 7, a hole 9c superimposed on an eyepiece window 9b of a viewfinder, and also openings for a lens hood 8, an objective window 9a of the viewfinder, and a counter wheel 10 visible through an indicator hole.

Figure 2:
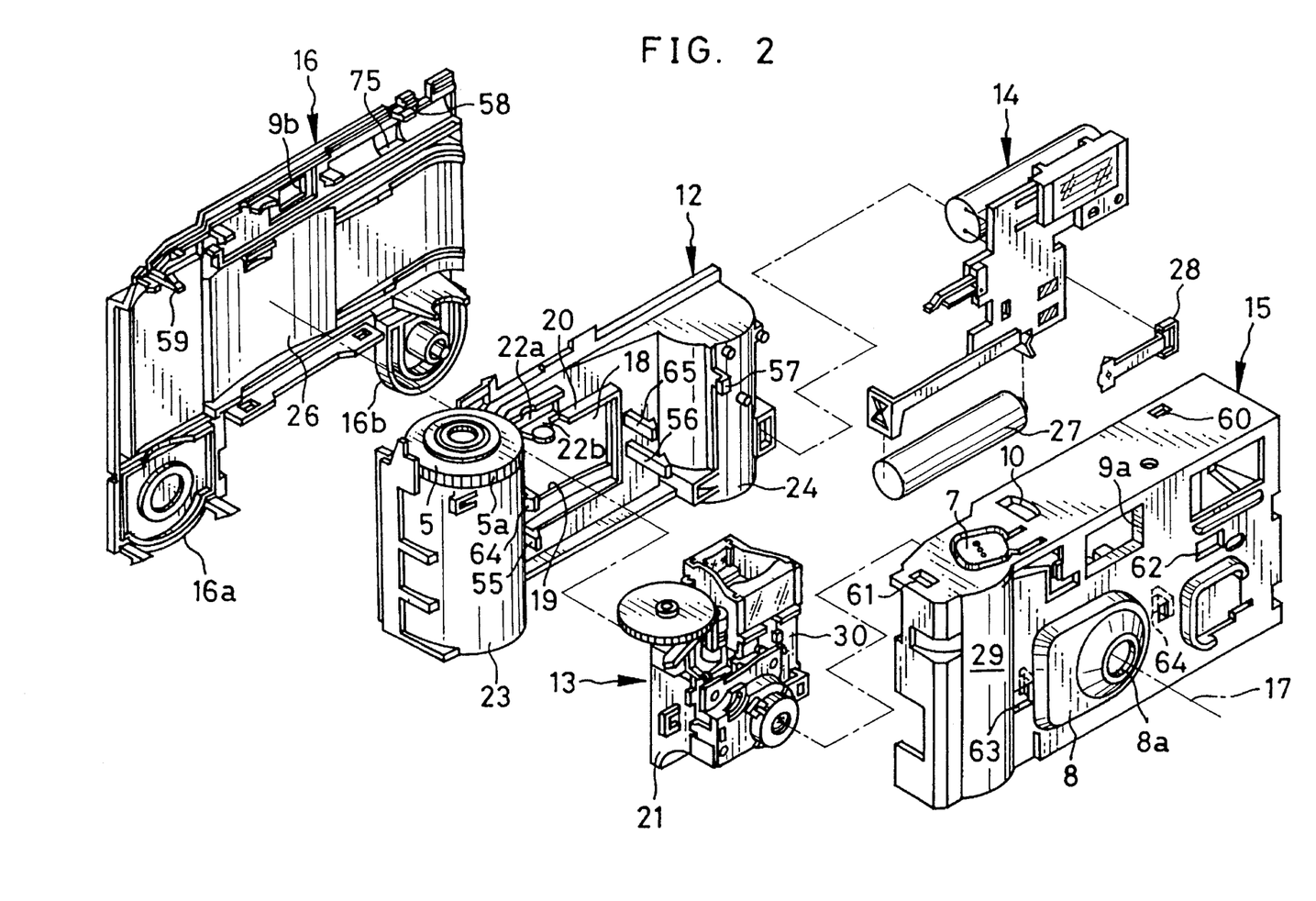
FIG. 2 is an exploded perspective view illustrating the lens-fitted photo film unit of FIG. 1.
Figure 3:
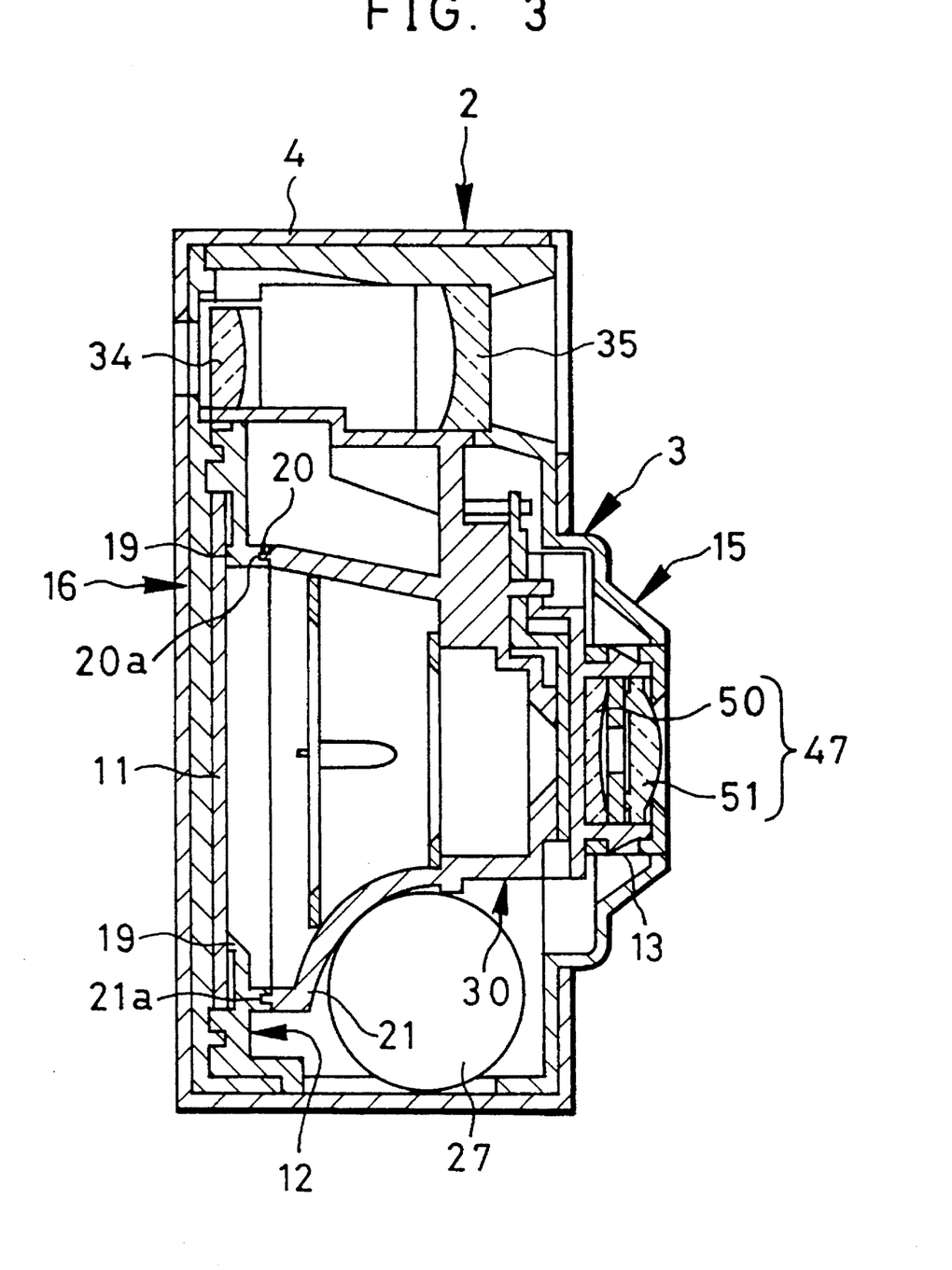
FIG. 3 is a cross section illustrating the lens-fitted photo film unit.
Figure 4:
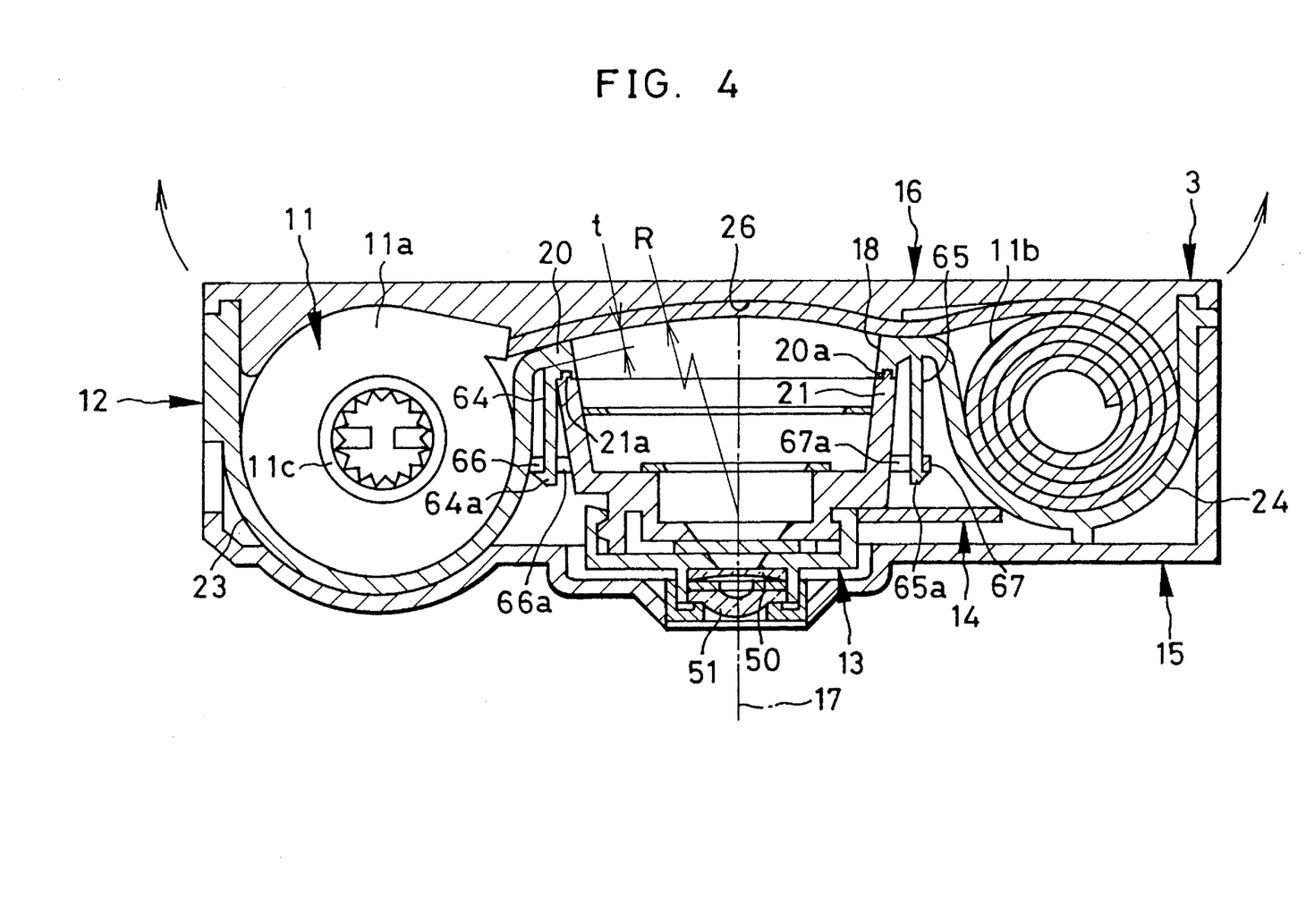
FIG. 4 is a horizontal section illustrating the lens-fitted photo film unit.

As illustrated in FIGS. 2, 3 and 4, the film housing 3 is constituted of a film containing section 12, an exposure unit 13, an electronic flash device 14, a front cover 15, a rear cover 16 and a photo film 11 of 135 type with a cassette 11a. Those parts are assembled together fixedly by retention hooks or claws.

An exposure aperture 18 is formed to lie on a photographic light path 17 through the containing section 12. The rear of the exposure aperture 18 has a film rail face 19 formed in an arcuate shape and having a radius R of curvature in a longitudinal direction of the film 11. The radius R is approximately 100 mm, and is adapted to correct the curvature of the field of a taking lens 47. A frame-like ridge 20 in a rectangular shape is formed on the front of the film containing section 12 and projects from around the exposure aperture 18, to be fitted on an exposure tunnel 21. The frame-like ridge 20 is provided with an opening 22a and a projecting portion 22b. The opening 22a receives a sprocket wheel 38 (See FIG. 5), which consists of a mechanism for charging the shutter device and provided on the exposure unit 13. The projecting portion 22b is inserted below the sprocket wheel to support the sprocket wheel and to shield the photographic light path 7 from ambient light. The frame-like ridge 20 is provided with such a projecting height that the thickness t of the film rail face 19 is sufficiently great, and that a groove 20a formed in the frame-like ridge 20 is sufficiently deep for protection of the light path 7 from ambient light in cooperation with a narrowed ridge 21a. Note that the groove 20a is eliminated from FIG. 2 only for convenience of illustration.

The light path 17 is located between a film take-up chamber 23 and a film supply chamber 24. A front of the take-up chamber 23 projects beyond the front of the supply chamber 24.

The inside of the rear cover 16 is provided with an arcuate regulating face 26, which confronts the aperture 18 and is set off from the film rail face 19 a distance to accommodate consideration of the film thickness, in addition to the radius R of the curvature of the film rail face 19. The bottom of the rear cover 16 has lids 16a and 16b of a pull-top type, which cover the bottoms of the take-up chamber 23 and the supply chamber 24. The lid 16a is opened for removal of the cassette 11a containing the film 11 after exposure. The top portion of the rear cover 16 has eyepiece openings 9b and 75 of the viewfinders, the former for standard or wide-angle photography, and the latter for telephotography. As illustrated in FIG. 1, the eyepiece opening 9b is superposed on the hole 9c in the packaging 4 and appears externally. The eyepiece opening 75 is blocked and closed by the packaging 4.

The cassette 11a is contained in the film take-up chamber 23. An unexposed roll 11b of the film 11 which has been drawn out of the cassette 11a is contained in the film supply chamber 24. Then the rear cover 16 is secured to enclose the film 11 in light-tight fashion. The take-up chamber 23 has a diameter adapted to the 135 film cassette defined by the ISO (International Organization for Standardization). The supply chamber 24 has a diameter smaller than that of take-up chamber 23. The unexposed roll 11b of the film 11 has no core or spool while contained in the supply chamber 24. The diameter of the roll 11b is thus smaller than that of the cassette 11a.

Above the take-up chamber 23, the winding wheel 5 is mounted rotatably, and is engaged with a spool 11c of the cassette 11a. The periphery of the winding wheel 5 is provided with teeth 5a which are formed at a regular pitch and adapted to engage with a claw for the purpose of rotating in reverse. The winding wheel 5 is externally rotated after effecting each exposure, to wind the photo film 11 into the cassette 11a.

As is evident from FIG. 4, the take-up chamber 23 and the supply chamber 24 have axes that lie in a common plane, and the rear edges of the exposure tunnel 21 lie behind that plane.

Figure 5:
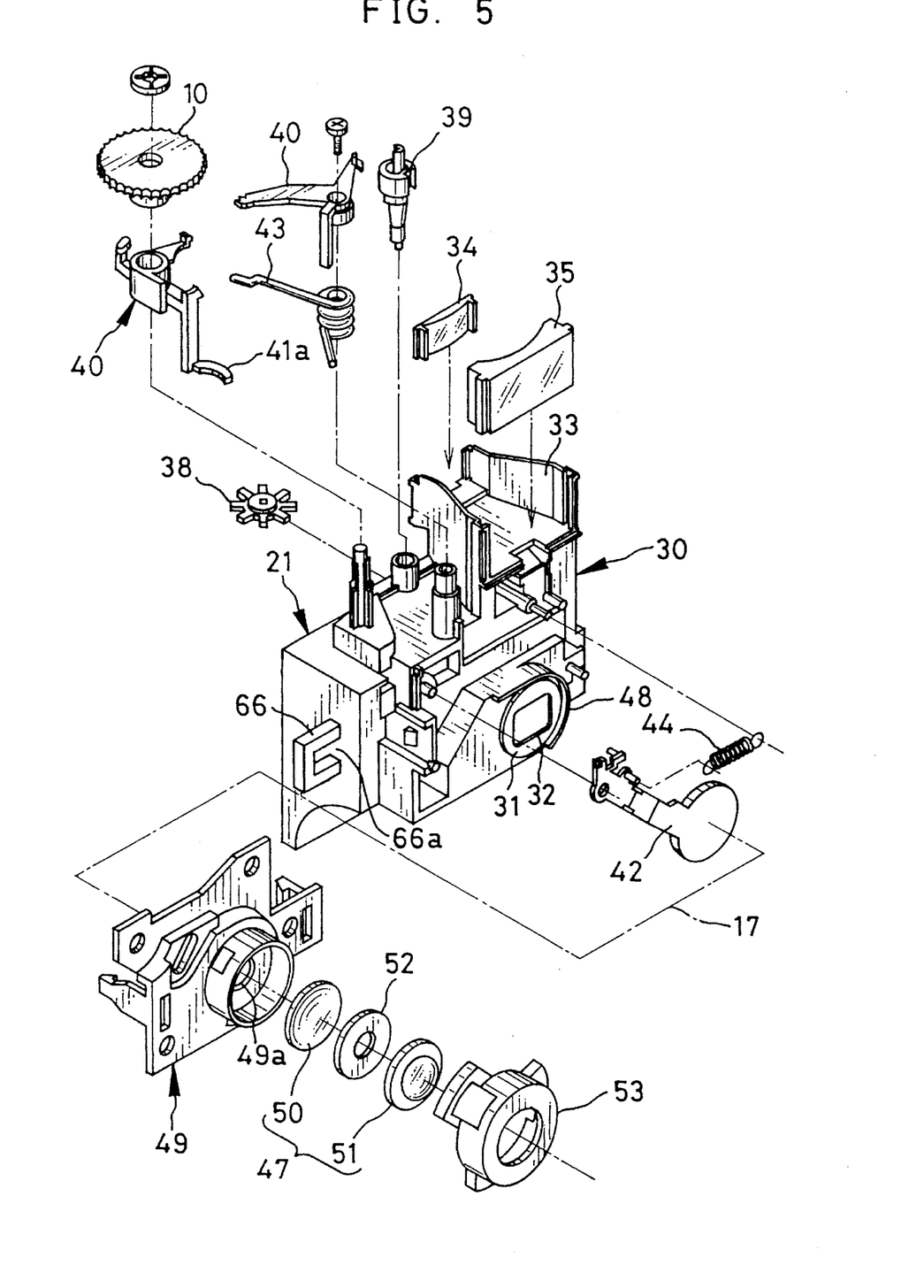
FIG. 5 is an exploded perspective view illustrating an exposure unit incorporated in the lens-fitted photo film unit.

In FIG. 5 wherein the exposure unit 13 is shown disassembled, the exposure unit 13 has a one-piece support 30 provided with a shutter device and a film one-frame advance mechanism, and the exposure tunnel 21 formed to extend through the support 30 for surrounding the light path 17. The form of the exposure tunnel 21 heightens the rigidity of the support 30. This is to prevent the support 30 from being deformed even when left at a high temperature for a long time, although such a problem would occur with a conventional exposure unit.

The support 30 has a shutter opening 32 lying on the light path 17 and a finder support portion 33 on its top. The finder support portion 33 has a U-shape open toward the top. An eyepiece lens 34 and an objective lens 35 are inserted in the finder support portion 33 to constitute reversed Galilean viewfinder.

The shutter device and the film one-frame advance mechanism are constituted by a plastic sprocket wheel 38, a shutter setting cam 39, a retaining lever 40, a striking lever 41, a shutter blade 42, the counter wheel 10, a metallic drive spring 43, and a spring 44. As is known in the art, rotation of the winding wheel 5 rotates the spool in the cassette to move the film 11. The movement of the film 11 causes the sprocket wheel 38 to rotate the shutter setting cam 39. The retaining lever 40 is caused to set the striking lever 41 in its charged position, while the count of the counter wheel 10 is increased by one. Depression of the shutter release button 7 rotates the retaining lever 40 a small amount, and disengages it from the striking lever 41, of which an arm portion 41a strikes the shutter blade 42 under the bias of the drive spring 43. The shutter blade 42 is so formed that its section has a crank shape crossing the light path 17, for the purpose of reducing the overall thickness of the lens-fitted photo film unit. A wall 48 receives the shutter blade 42. Note that the shutter device and the one-frame advancing mechanism of the lens-fitted photo film unit herein referred to generally have the same photographic function as disclosed in U.S. Pat. Nos. 4,884,087 and 4,972,649 (both of which correspond to JP-B 2-32615).

The front of the shutter blade 42 is covered with a shutter cover 49, in which a stop aperture 49a is formed. In the shutter cover 49, lens elements 50 and 51, a spacer 52 and a lens cover 53 complete the assembly of the exposure unit 13. The lens elements 50 and 51 constitute the taking lens 47 having a focal length of 32 mm and adapted to the curvature of the film rail face 19 at the radius R. The lens cover 53 appears through a hole 8a in the lens hood 8.

In FIGS. 3 and 4, the exposure unit 13 is fixed on the frame-like ridge 20 at the exposure tunnel 21 of the support 30. The rear edge of the exposure tunnel 21 has the narrowed ridge 21a fully along its rectangular shape. The narrowed ridge 21a is inserted in the groove 20a formed in the frame-like ridge 20, so that the exposure tunnel 21 is connected to the exposure aperture 18 in light-tight fashion about the light path 17.

As illustrated in FIG. 4, lateral sides of the frame-like ridge 20 are provided with arms 64 and 65 having claws or hooks 64a and 65a projecting in outward directions opposite to and away from each other. Openings 66a and 67a are formed in projecting portions 66 and 67 on the lateral faces of the exposure tunnel 21, and receive inserted arms 64 and 65. The hooks 64a and 65a are engaged with the projecting portions 66 and 67, to retain the exposure unit 13 disengageably from the film containing section 12. Should instead the hooks be projected toward each other in reverse of the hooks 64a and 65a, there would be danger of inadvertent disengagement of the hooks from an exposure unit upon generally twisting a film containing section, in directions of the arrows on both ends of the unit shown in FIG. 4. The exposure unit would be likely to fall off and be damaged seriously. However the hooks 64a and 65a in the present invention are directed away from one another, and so do not engage from the exposure unit 13 even when the film containing section 12 is twisted. Note that the present invention is naturally applicable to construction having conventional engaging hooks directed toward each other, which may be preferred for the purpose of convenience in automation of disassembly of the film unit of which the exposure unit should be removed easily from the film containing section, for recycling the lens-fitted photo film unit.

Finally, the front cover 15 is fixed on the front of the film containing section 12. The front cover 15 is fixed through engagement of the hooks 55 to 59 of the film containing section 12 with the rear cover 16: the hook 55 engages with a hook 63; the hook 56 with a hook 64; the hook 57 with an opening 62; the hook 58 with an opening 60; and the hook 59 with an opening 61. A portion 29 of the front cover 15 is projects about the outside of the take-up chamber 23, and constitutes the grip portion 29 of the film housing 3.

Figure 6:
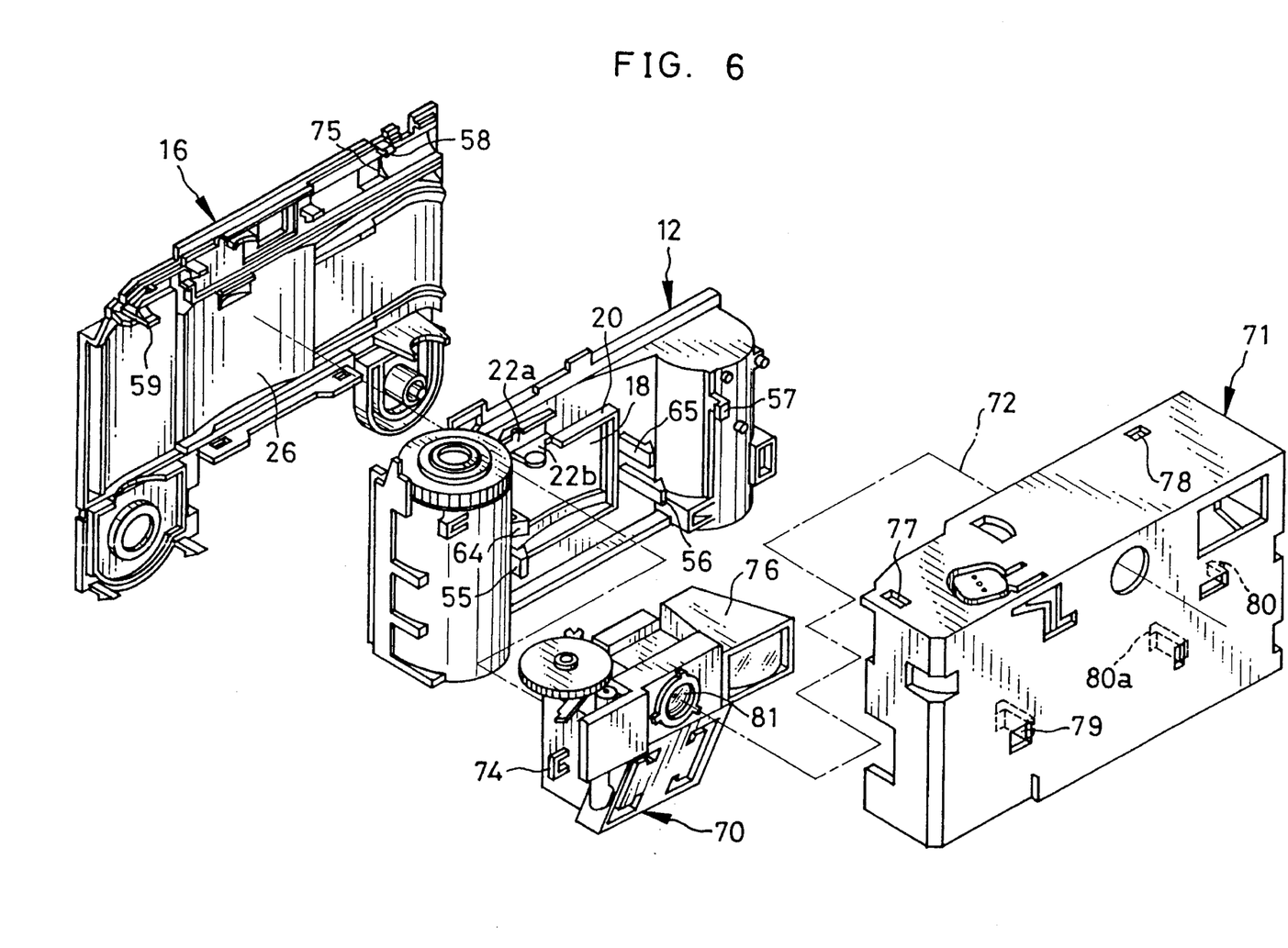
FIG. 6 is an exploded perspective view illustrating a telephoto type of lens-fitted photo film unit.
Figure 7:
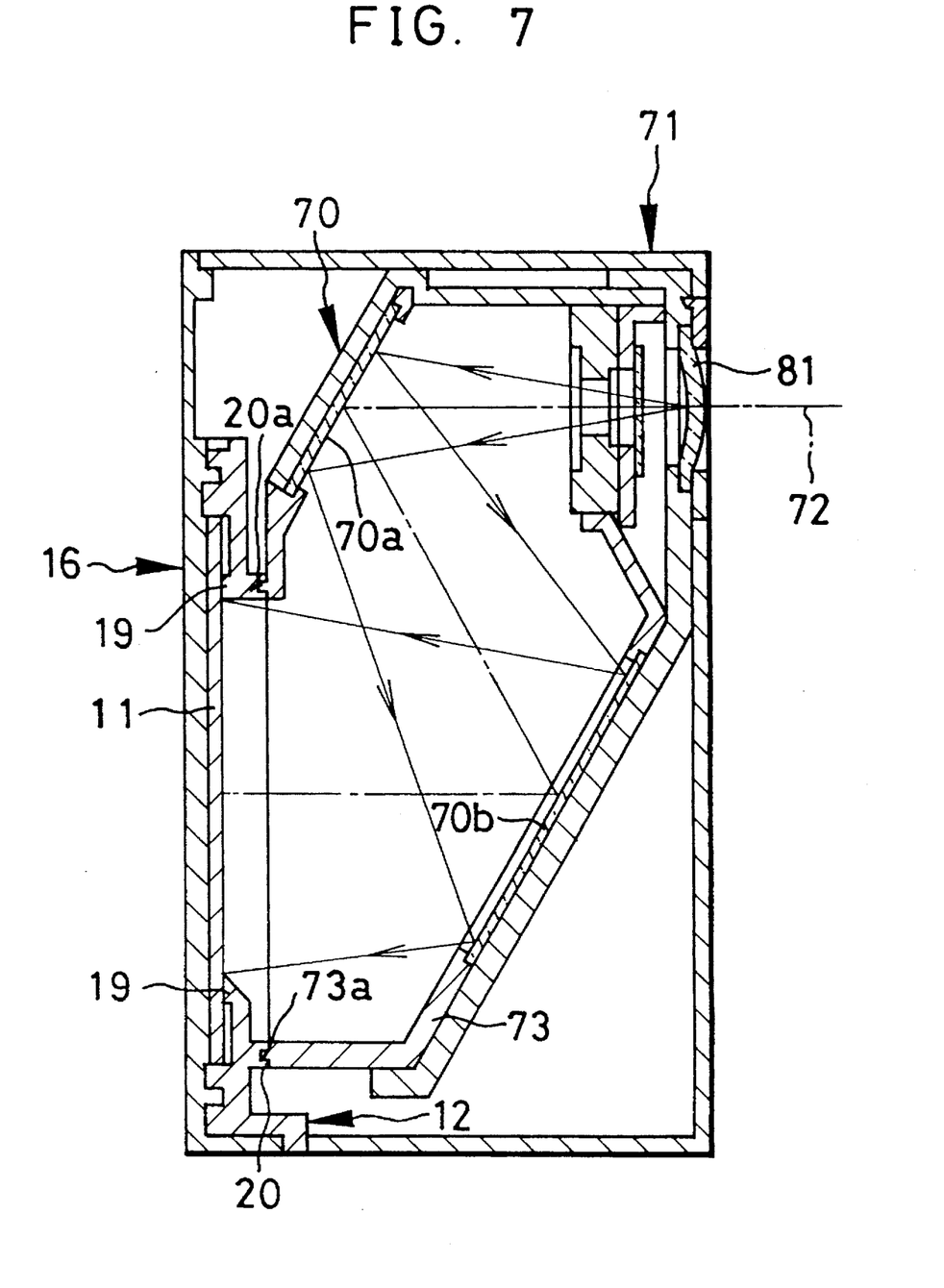
FIG. 7 is a cross section illustrating the lens-fitted photo film unit of FIG. 6.

As illustrated in FIGS. 6 and 7, an exposure unit 70 of the telephoto type and a front cover 71 can be mounted on the above film containing section 12 and rear cover 16 in combination. The exposure unit 70 has a taking lens 81, two mirrors 70a and 70b and an exposure tunnel 73. The taking lens 81 has a focal length of 86 mm. The mirrors 70a and 70b fold a photographic light path 72 in a Z-shape by reflection, and thus lengthen the distance between the taking lens 81 and the film 11. The exposure tunnel 73 incorporates the taking lens 81 and the mirrors 70a and 70b, and is provided with a shutter device and a film one-frame advance mechanism.

Openings are formed in projecting portions 74 on the lateral faces of the exposure tunnel 73, and receive insertion of the arms 64 and 65 beside the frame-like ridge 20. In combination of the exposure unit 70 with the film containing section 12, the hooks 64a and 65a are engaged with the projecting portions 74, to retain the exposure unit 70 in disengageable fashion. The projecting portions 74 are shaped identically with the projecting portions 66 and 67 of FIG. 4. The hooks 64a and 65a prevent the exposure unit 70 from disengaging even when the film containing section 12 is twisted. A narrowed ridge 73a of the exposure tunnel 73 is inserted in the groove 20a in the frame-like ridge 20, to protect the inside of the exposure tunnel 73 from ambient light. Note that the groove 20a is eliminated from FIG. 6 only for convenience of illustration.

The film containing section 12 with the exposure unit 70 mounted thereon receives the cassette 11a in the take-up chamber 23 and the roll 11b of the film 11 in the supply chamber 24. Then the rear cover 16 is fixed on the rear of the film containing section 12. The rear cover 16 has an eyepiece opening 75, which is superposed on a telephoto viewfinder 76 mounted in the exposure unit 70. The front of the film containing section 12 is covered by the front cover 71 which fixes the exposure unit 70 to the film containing section 12. As also in the former embodiment, the front cover 71 is fixed through engagement of the hooks 55 to 59: the hook 55 with a hook 79; the hook 56 with a hook 80a; the hook 57 with a hook 80; the hook 58 with an opening 78; and the hook 59 with an opening 77. The film housing of the telephoto type is contained in a cardboard packaging (not shown). The eyepiece opening 75 is superposed on a hole in the packaging and appears externally. The eyepiece opening 9b is blocked and closed by the same packaging, in a fashion reversed from the packaging 4 in FIG. 1. Accordingly, a combination of the plural eyepiece openings 9b and 75 formed in the rear cover 16 is advantageous to enable the use of a single type of rear cover 16 with plural types of lens-fitted photo film units, as a selected eyepiece opening is selectively blocked by the packaging with the remaining eyepiece opening open in superposition with a hole, for adaptation to the exposure unit with which it is to be combined. Note that the telephoto type of lens-fitted photo film unit herein referred to generally has the same photographic function as disclosed in U.S. Pat. No. 5,084,719 (which corresponds to JP-U 2-104340).

Figure 8:
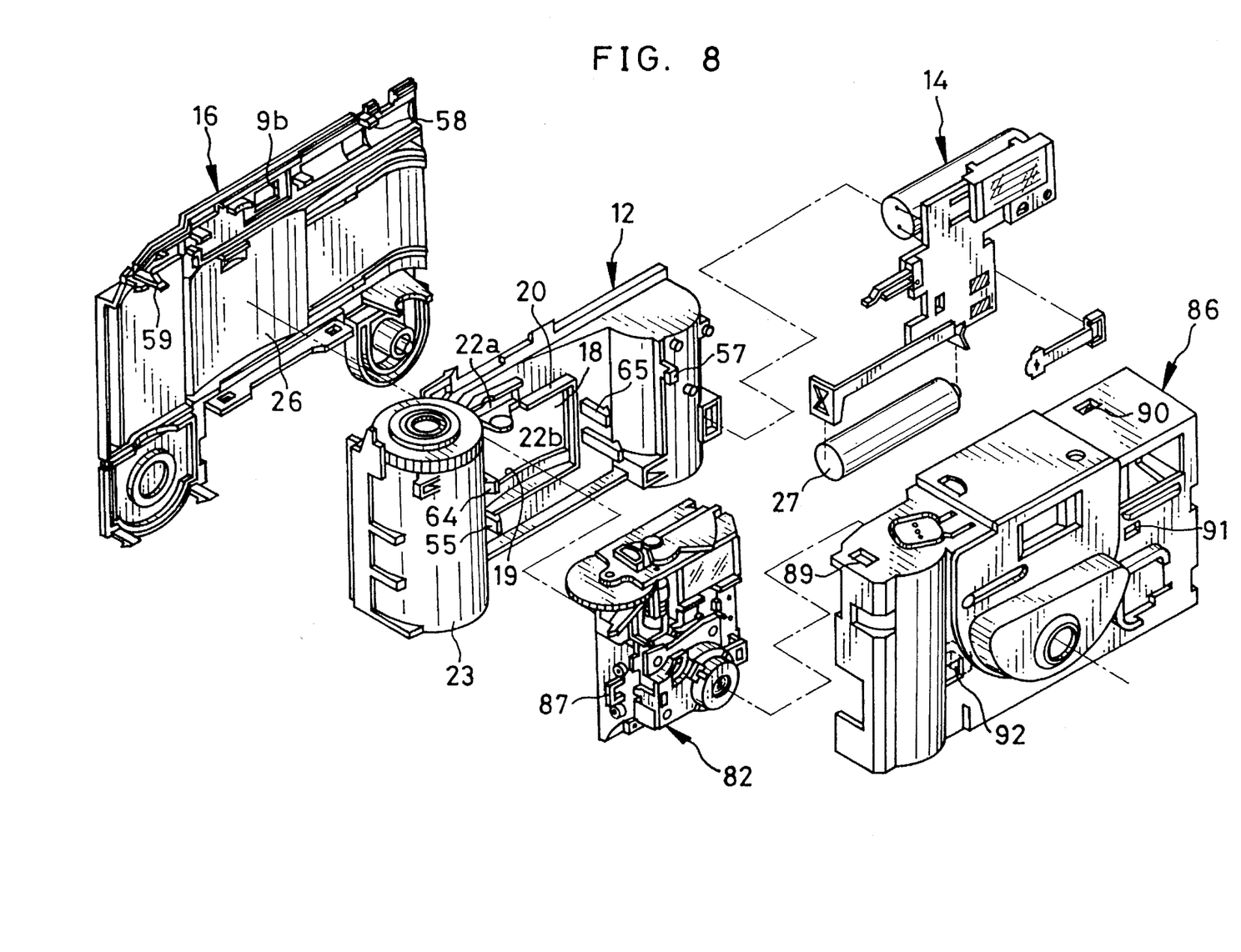
FIG. 8 is an exploded perspective view illustrating a panorama-changeable type of lens-fitted photo film unit.
Figure 9:
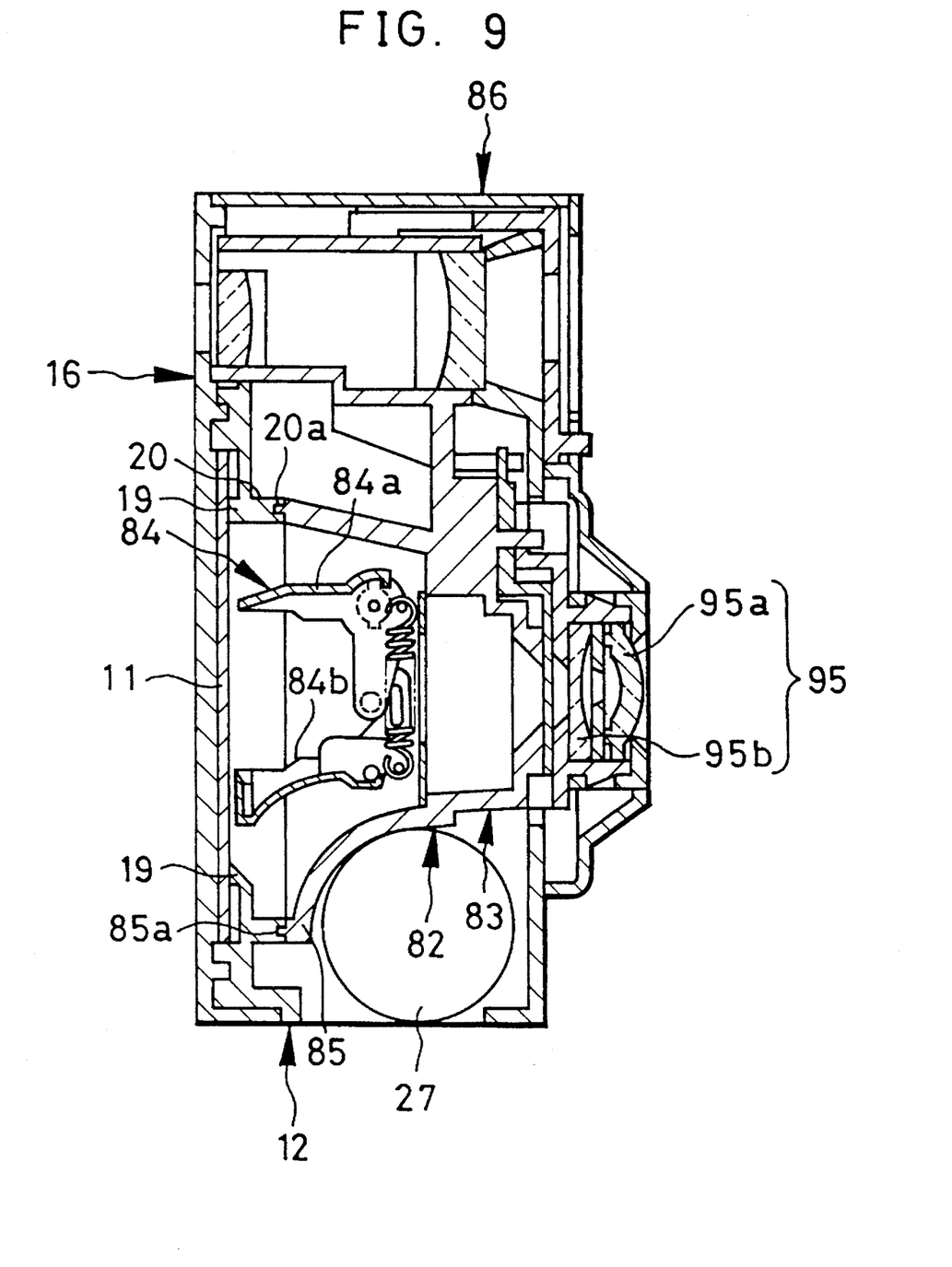
FIG. 9 is a cross section illustrating the lens-fitted photo film unit.

As illustrated in FIGS. 8 and 9, an exposure unit 82, of a type changeable between standard photography and panoramic photography, and a front cover 86 can be mounted on the above film containing section 12 and rear cover 16 in combination. The exposure unit 82 has a taking lens 95, a one-piece support 83, and an exposure tunnel 85. The taking lens 95 is constituted by lens elements 95a and 95b, and has a focal length of 32 mm. The support 83 is provided with a shutter device and a film one-frame advance mechanism. The exposure tunnel 85 incorporates a frame changeover mechanism 84, which consists of two opaque swingable plates 84a and 84b for shielding light.

Openings are formed in projecting portions 87 on the exposure tunnel 85, and receive the arms 64 and 65 beside the frame-like ridge 20. In combination with the film containing section 12, the hooks 64*a* and 65*a* are engaged with the projecting portions 87, to retain the exposure unit 82. The projecting portions 87 are shaped identically to the projecting portions 66 and 67 of FIG. 4. The hooks 64*a* and 65*a* prevent the exposure unit 82 from disengaging even when the film containing section 12 is twisted. A narrowed ridge 85*a* of the exposure tunnel 85 cooperates with the groove 20*a*, to protect the inside of the exposure tunnel 85 from ambient light. Note that the groove 20*a* is eliminated from FIG. 8 only for convenience of illustration.

The film containing section 12 with the exposure unit 82 mounted thereon receives the cassette 11*a* in the take-up chamber 23 and the roll 11*b* of the film 11 in the supply chamber 24. Then the rear cover 16 is fixed on the rear of the film containing section 12. The front of the film containing section 12 is covered by the front cover 86 which fixes the exposure unit 82 on the film containing action 12. Note that the front cover 86 is provided with an operable button accessing the panoramic changeover mechanism for its changeover operation. As is common to the former embodiments, the front cover 86 is fixed through engagement of the hooks 55 and 57 to 59: the hook 55 with a hook 92; the hook 57 with an opening 91; the hook 58 with an opening 90; and the hook 59 with an opening 89. Note that the panoramic changeover type of lens-fitted photo film unit herein referred to generally has the same photographic function as in commonly assigned co-pending patent application U.S. Ser. No. 08/169,203.

The rear cover 16 has the eyepiece opening 9*b*, which is superposed on a viewfinder mounted in the exposure unit 82. The film housing of the panoramic changeover type is contained in a cardboard packaging (not shown). The eyepiece opening 9*b* is superposed on a hole in the packaging and appears externally. The eyepiece opening 75 is blocked and closed by the same packaging, in a manner similar to FIG. 1.

As is described above, the different types of lens-fitted photo film units can be combined with the commonly prepared rear cover 16 and film containing section 12 having the film rail face 19, as the taking lenses with the different focal lengths can are compatible with the same radius R of curvature of the film rail face 19.

The hooks of the film containing section 12 and the rear cover 16 are commonly used for retention of the three different types of exposure units. It is thus possible to modify a line assembling units of the standard type to be a line for assembling units of the telephoto type or of the panoramic changeover type. Film containing sections may be conveyed by a conveyor belt, provided with three different types of exposure units as needed and checked after assembly. It is possible for the manufacturing line automatically to select types of front cover and cardboard packaging in accordance with the detected type. A single automated manufacturing line is thus enabled to produce plural types of lens-fitted photo film units without great modification or great idle time. Furthermore, used lens-fitted photo film units collectively withdrawn in a mixture of various types can be treated in the single line where they are disassembled, and their parts can be classified to separate reusable ones from remoldable ones to be recycled. Suitability for automation of assembly and recycling is increased, together with improved efficiency of manufacture and assembly.

In the above, the film containing section 12 and the rear cover 16 are common to lens-fitted photo film units of the standard type, the telephoto type, and the type changeable between standard photography and panoramic photography. However the present invention is applicable to the use of those parts in common with a simple panoramic type and/or a wide-angle type.

In the above, the narrowed ridge 21*a*, 73*a*, 85*a* is formed in the middle of the rear edge of the exposure tunnel 21, 73, 85. Alternatively, a narrowed ridge may be formed along the outside of, or along the inside of, the rear edge of the exposure tunnel. In other words, a frame-like ridge and the rear edge of the exposure tunnel can have any stepped shapes that can be engaged with one another for blocking ambient light reliably.

Although the present invention has been fully described by way of preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A lens-fitted photo film unit including an exposure aperture, a supply chamber for containing unexposed photo film, and a take-up chamber for winding said photo film after exposure, said supply chamber and said take-up chamber disposed beside said exposure aperture opposite to one another, said lens-fitted photo film unit including a taking lens and a shutter device, said lens-fitted photo film unit comprising:

a film containing section in which said exposure aperture, said supply chamber and said take-up chamber are formed;

an exposure unit, secured in front of said film containing section in removable fashion, and including said shutter device; and an exposure tunnel, formed on and extending through said exposure unit and around a light path from said taking lens toward said exposure aperture, for protecting said light path from ambient light, said supply chamber and said take-up chambers having axes that lie in a common plane, rear edges of said exposure tunnel lying behind said plane.

2. A lens-fitted photo film unit as defined in claim 1, wherein said exposure unit further includes a one-frame advance mechanism for stopping said film from moving upon an advance of said film by one frame.

3. A lens-fitted photo film unit as defined in claim 1, further comprising a rear cover, secured behind said film containing section for covering said film containing section and for supporting said film behind said exposure aperture.

4. A lens-fitted photo film unit as defined in claim 3, further comprising:

a film rail face, formed on said film containing section and behind said exposure aperture, to confront said rear cover, for supporting edges of said film, said film rail face shaped arcuately in a longitudinal direction of said film;

a frame-like ridge, formed on said film containing section, projected toward a front from around said exposure aperture and in a rectangular shape; and interfitting recesses and protrusions formed on said exposure unit and on a rear edge of said exposure tunnel and on said frame-like ridge, for connecting said exposure tunnel to said exposure aperture in light-tight fashion.

5. A lens-fitted photo film unit as defined in claim 4, wherein said film rail face has a curvature of which a radius is substantially 100 mm.

6. A lens-fitted photo film unit as defined in claim 4, wherein said recesses and protrusions include a narrowed ridge projected from said rear edge of said exposure tunnel toward a rear at a width smaller than said rear edge; and said frame-like ridge includes a groove for receiving said narrowed ridge.

7. A lens-fitted photo film unit as defined in claim 6, further comprising:

a pair of arm portions formed on said film containing section and beside said frame-like ridge opposite to one another;

a pair of claw portions, respectively formed on a distal end of said arm portions in outward directions extending away from one another; and a pair of receiving holes, formed in said exposure unit closely to lateral edges thereof, for respectively receiving said claw portions to be engaged therewith, so as to retain said exposure unit on said film containing section.

8. A lens-fitted photo film unit as defined in claim 6, further comprising an arcuate regulating face, formed on said rear cover, and confronting said film rail face, for forming a passageway through which said film passes.

9. A lens-fitted photo film unit as defined in claim 8, wherein said exposure unit includes:

a first mirror, disposed in said exposure tunnel and behind said taking lens, for reflecting light passed through said taking lens toward a bottom; and a second mirror, disposed in said exposure tunnel, under said first mirror and in front of said exposure aperture, for reflecting said light reflected on said first mirror toward said exposure aperture.

10. A lens-fitted photo film unit as defined in claim 8, further comprising a pair of light-shielding plates, associated with said exposure tunnel, disposed in horizontally extended orientation, movable in association with one another, moved between open and closed positions, wherein said light-shielding plates in said open position are retracted from said light path laid toward said exposure aperture fully to open said exposure aperture, said light-shielding plates in said closed position are entered into said light path to intercept a top and a bottom of said exposure aperture, and said exposure unit in said open position creates a full-size frame on to said film, and in said closed position creates on said film a frame defined by narrowing said full-size frame.

11. A lens-fitted photo film unit preloaded with unexposed film, and including an exposure aperture, a taking lens, a shutter device, and a viewfinder comprising an eyepiece lens and an objective lens, said lens-fitted photo film unit comprising:

an exposure unit including said shutter device and said viewfinder, and selected from a group of plural different exposure units;

a film containing section, in which said exposure aperture is formed, which is provided with said selected exposure unit secured in front thereof, and which contains said film;

a rear cover, secured behind said film containing section, for covering said film containing section and for supporting said film behind said exposure aperture;

plural eyepiece openings, formed in said rear cover, and respectively located to be disposed behind differently positioned said viewfinders of said plural different exposure units, such that there will be one said eyepiece opening behind a said viewfinder no matter which of said different exposure units is employed;

a packaging disposed around at least a portion of said exposure unit, said film containing section and said rear cover; and a single eyepiece hole, formed in said packaging, and superposed on one of said plural eyepiece openings in correspondence with said viewfinder of said selected exposure unit, the remainder of said plural eyepiece openings being blocked by said packaging.

12. A lens-fitted photo film unit as defined in claim 11, further comprising:

a film rail face, formed on said film containing section and behind said exposure aperture, to confront said rear cover, for supporting edges of said film, said film rail face shaped arcuately in a longitudinal direction of said film;

a frame-like ridge, formed on said film containing section, projected toward a front from around said exposure aperture and in a rectangular shape; and interfitting recesses and protrusions formed on a rear edge of said exposure unit and on said frame-like ridge, for connecting said exposure unit to said exposure aperture in light-tight fashion.

13. A lens-fitted photo film unit as defined in claim 12, further comprising:

a pair of arm portions formed on said film containing section and beside said frame-like ridge opposite to one another;

a pair of claw portions, respectively formed on a distal end of said arm portions in directions opposite to one another; and a pair of receiving holes, formed in said exposure unit closely to lateral edges thereof, for respectively receiving said claw portions to be engaged therewith, so as to retain said exposure unit on said film containing section.

14. A lens-fitted photo film unit as defined in claim 12, wherein a first of said eyepiece openings is located directly above said exposure aperture, and a second of said eyepiece openings is located obliquely above said exposure aperture.

15. A lens-fitted photo film unit as defined in claim 14, wherein said first eyepiece opening overlies the position of the viewfinder of one of said exposure units which includes a pair of light-shielding plates, disposed in horizontally extended orientation, movable in association with one another, moved between open and closed positions, wherein said light-shielding plates in said open position are retracted from said light path laid toward said exposure aperture fully to open said exposure aperture, said light-shielding plates in said closed position are entered into said light path to intercept a top and a bottom of said exposure aperture, and said exposure unit in said open position creates a full-size frame on to said film, and in said closed position creates on said film a frame defined by narrowing said full-size frame.

16. A lens-fitted photo film unit as defined in claim 14, wherein said second eyepiece opening is associated with one of said exposure units which includes:

a first mirror, disposed behind said taking lens, for reflecting light passed through said taking lens toward a bottom; and a first mirror, disposed under said second mirror and in front of said exposure aperture, for reflecting said light reflected on said first mirror toward said exposure aperture.

* * * * *